United States Patent [19]
Havens

[11] Patent Number: 5,443,612
[45] Date of Patent: Aug. 22, 1995

[54] METHODS OF MAKING AGRICULTURAL MATERIALS

[76] Inventor: Terry L. Havens, 209 Oak St., Wenona, Ill. 61377

[21] Appl. No.: 199,111

[22] Filed: Feb. 22, 1994

[51] Int. Cl.⁶ ............................................. C05F 9/00
[52] U.S. Cl. ............................................ 71/5; 71/23; 71/903; 71/904
[58] Field of Search .................. 71/5, 23, 903, 904, 71/12, 21

[56] References Cited

U.S. PATENT DOCUMENTS

| | | | |
|---|---|---|---|
| 1,882,377 | 10/1932 | Whitthlsey | 47/9 |
| 1,978,102 | 10/1934 | Clapp | 47/1 |
| 2,019,824 | 11/1935 | Liehr et al. | 71/9 |
| 3,047,453 | 7/1962 | Shook, Jr. | 162/100 |
| 3,111,453 | 11/1963 | Helversen | 162/201 |
| 3,269,824 | 8/1966 | Aswell | 71/64 |
| 4,297,810 | 11/1981 | Hansford | 47/9 |
| 4,369,597 | 1/1983 | Leep et al. | 47/9 |
| 4,813,996 | 3/1989 | Gardner et al. | 71/21 |
| 4,986,026 | 1/1991 | Decker | 47/56 |
| 5,177,898 | 1/1993 | Decker | 47/56 |

FOREIGN PATENT DOCUMENTS

8905574  6/1989  WIPO .............................. 71/5

OTHER PUBLICATIONS

Dergham, et al., "Waste Paper as a Substitute for Peat in the Mushroom (*Agaricus bisporus*) Casing Soil Production," *Science and Cultivation of Edible Fungi*, Maher (ed.), pp. 263–267, 1991 Balkema, Rotterdam. (no month).

Edwards, "Recycling Newsprint in Agriculture," *Bio-Cycle*, Jul. 1992.

Edwards, et al., "Applying Organics to Agricultural Land," pp. 48–50, *BioCycle*, Oct. 1993.

Edwards, et al., "Impact of Newsprint on Soil and Plant Ecosystems," pp. 1–15, presented Mar. 8–12, 1993.

Edwards, et al., "Effects of Soil-Applied Noncomposted Organic Wastes on Upland Cotton," pp. 1354–1356, Cotton Soil Management and Plant Nutrition Conference, 1993 Beltwide Cotton Conferences (no month).

Mitchell, et al., "Organic By–Products on Agricultural Soils," pp. 1–4, *Auburn University Farm Demonstration Report*, Mar. 1993.

Walker, et al., "Effects of Noncomposted Waste Materials on Weed Control in Crops," p. 3, *Alabama Agricultural Experiment Station*, Reprinted from *Highlights of Agricultural Research*, vol. 4, No. 3, Published by Alabama Agricultural Experiment Station, Auburn University, Alabama 36849 (No Date).

4 page product brochure entitled "CPM Pellet Mills" (No date).

6 page product brochure entitled "CPM Dies" (No date).

4 page product brochure entitled "Series G Counterflow Coolers" (no date).

General Dimension Drawing entitled "Model 7730 'RDF' Densifier Conditioner/Conveyor Arr. JA with Live Bottom Feeder," Drawing No. D–14851-0 (No date).

*Primary Examiner*—Ferris Lander
*Attorney, Agent, or Firm*—Marshall, O'Toole, Gerstein, Murray & Borun

[57] ABSTRACT

Methods of making agricultural materials for aiding and facilitating the growth of plants and crops are based on the combination of waste paper and other materials and the formation of such combinations into pellets. Where the agricultural material is for use in the casing layer of a mushroom tray, the agricultural material is made from a combination of waste paper and a pH adjusting material, which is preferably lime. Where the agricultural material is for general use in agricultural and horticultural applications, it is made from a combination of waste paper and compost material, the ratio of the compost used in the combination being between about 90% to 40% by weight.

14 Claims, 1 Drawing Sheet

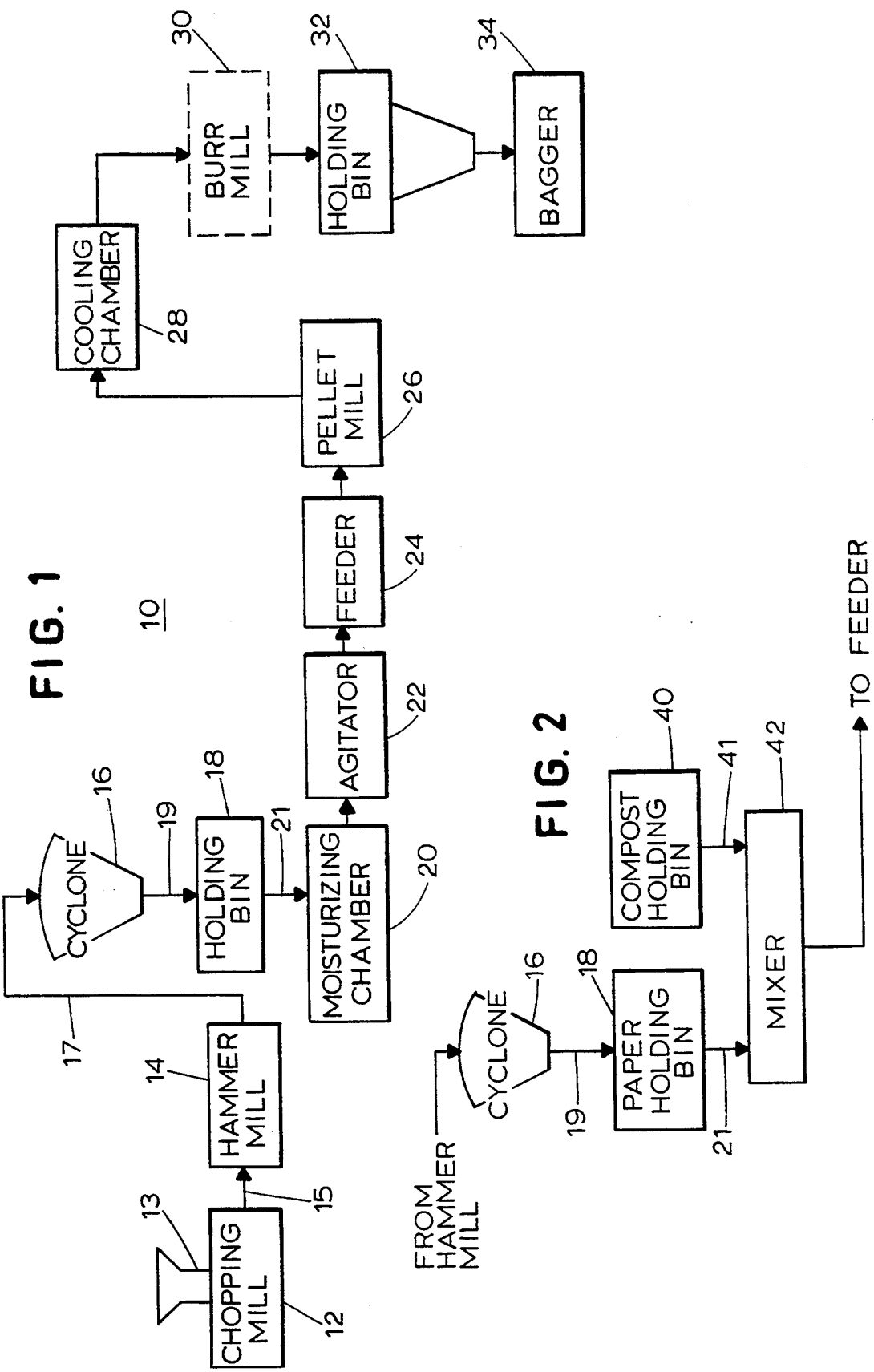

METHODS OF MAKING AGRICULTURAL MATERIALS

BACKGROUND OF THE INVENTION

The present invention is directed to methods of making agricultural materials from waste paper and other constituents and using them in agricultural applications.

It has been previously proposed to make agricultural materials from waste paper. For example, U.S. Pat. No. 3,269,824 to Aswell discloses the manufacture of soil conditioning and fertilizing pellets from waste paper and fertilizer materials, such as nitrogen, phosphate, potash and calcium. In the Aswell process, the waste paper is macerated and repulped by standard paper regenerating processes. Water is then added and the mixture is pressure cooked into a slurry of finely divided cellulose fibers. The fertilizing materials are then added to the slurry and mixed by mechanical means. The resulting composite is then drained into a vacuum chamber where excess moisture is drawn off until the slurry reaches the consistency of stiff dough. The slurry is then extruded through a die plate having holes therein to form strands of material, which are cut into pellets. Any remaining moisture in the pellets is dried by infrared lamps.

The Aswell process has a number of disadvantages, a primary one of which is that it requires an unduly large amount of energy. In particular, a substantial amount of energy is consumed by repulping the paper. After the paper is repulped, water is added to the mixture before it is extruded into pellets. The use of a relatively large amount of water, in both the repulping stage and afterward, requires the use of infra-red lamps to dry the pellets after they are formed, which requires additional energy.

As is generally known, plants or crops require that the soil in which they grow have a carbon-to-nitrogen ratio within a particular range, depending upon the plant or crop. For example, a particular plant may require soil having a carbon-to-nitrogen ratio range between 20:1 and 70:1. If the carbon-to-nitrogen ratio for that plant is substantially greater than the higher boundary, 70:1, then the soil will act as a herbicide because it will draw nitrogen from the plant into the soil, thus gradually killing the plant. The carbon-to-nitrogen ratio of paper is generally about 800:1; therefore, paper that is not supplemented with nitrogen is not suitable as an agricultural material. As used herein, the term "agricultural material" generally refers to any soil supplement, replacement, or alternative used for the purpose of aiding or facilitating the growth of plants or crops. Unlike most plants or crops, mushrooms do not require any specific carbon-to-nitrogen ratio, and may be grown in agricultural materials having high carbon-to-nitrogen ratios, such as ratios in excess of 70:1.

Mushrooms are commercially grown in large quantities in trays having a bottom layer of compost material, which typically includes chicken feces or litter, and a top layer, about two inches thick, which typically includes sphagnum moss, a high-quality peat moss. The mushrooms grow in the top layer, which is called the casing layer. The carbon dioxide emitted by the decomposing compost facilitates the growth of the mushrooms. In order to grow, it is preferable that all areas of the casing layer have a pH that is between about 7 and 9.

Although generally adequate, the growth of mushrooms in conventional trays as described above has a number of disadvantages resulting from the use of sphagnum moss for the casing layer. One disadvantage is the relatively high cost of sphagnum moss. Another disadvantage is that sphagnum moss, which is brown, may discolor the mushrooms when they are harvested, resulting in at least some of the mushrooms having brown spots on them. Consumers may refuse to buy mushroom packages containing mushrooms with brown spots.

An article entitled "Waste Paper as a Substitute for Peat in the Mushroom (*Agaricus bisporus*) Casing Soil Production" by Dergham, et al. discloses the use of various combinations of waste paper and black peat for use in the casing layers of mushroom trays.

Previously, waste paper and other materials have been converted into pellets for a number of non-agricultural applications, including waste-to-energy conversion systems in which the pellets are utilized as a source of combustion and for use as a hydrophilic material for soaking up spills of liquids such as oil. The manner in which the materials have been pelleted, which is conventional, has included the steps of grinding and/or shredding the material via one or more hammer mills or other devices, utilizing a cyclone, moisturizing the material, providing the material to a pellet mill for pelleting, cooling the pellets, and in some cases crumbling the pellets into smaller pellet fragments.

An article entitled "Recycling Newsprint in Agriculture" by J. H. Edwards discloses, inter alia, the use of a mixture of chicken broiler litter (which includes poultry excreta, feathers, wasted feed, and bedding materials), soil and finely ground newsprint in a number of trenches for growing crops. In one section of the article entitled "Land Application Methods," the author states that "Newsprint should be chopped or ground to furnish a product approximately 0.25 inches in size so that a mulch on the soil surface will not restrict seedling emergence," and that "An alternative method is pelletizing ground newsprint and then applying the pellets to the soil."

SUMMARY OF THE INVENTION

The present invention is generally directed to methods of making agricultural materials for aiding and facilitating the growth of plants and crops in which waste paper and other materials are combined together and formed into pellets.

In a first preferred method, an agricultural material for use in the casing layer of a mushroom tray is made from a combination of waste paper and a pH adjusting material, which is preferably lime. The method includes the steps of providing an amount of waste paper to a grinder, such as a hammer mill; providing an amount of the pH adjusting material to the grinder; and grinding the waste paper and the pH adjusting material together in the grinder to form an agricultural mixture, which may have the form of a fluff-like material. The density of the agricultural mixture is lower than the density of the original waste paper, and substantially all of the agricultural mixture has a substantially uniform carbon-to-nitrogen ratio in excess of about 70:1 and a substantially uniform pH of between about 7 and 9. The mixture is then densified, preferably by providing it to a pellet mill, to form an agricultural material, which may then be provided in the casing layer of a mushroom tray. The use of an agricultural material formed from a combination of waste paper and pH adjusting material is advantageous in that it is relatively cheap and does not result in discoloration of the mushrooms in the mushroom tray, assuming that waste paper having a relatively neutral color, such as white or gray, is used.

In a second preferred method, an agricultural material for general use in agricultural and horticultural applications is made from a combination of waste paper and compost material. The method includes the steps of rending sheets of waste paper to generate paper fragments having a size smaller than the waste paper sheets; mixing the waste paper fragments with an amount of compost material to generate an agricultural mixture, the amount of waste paper fragments mixed with the compost material being between about 90% and 40% by weight; conveying the agricultural mixture to a pellet mill; and forming the agricultural mixture into pellets via the pellet mill. The resultant agricultural material can be used in its pelleted form, or alternatively, the pellets can be crumbled into pellet fragments and used in that form.

These and other features and advantages of the present invention will be apparent to those of ordinary skill in the art in view of the detailed description of the preferred embodiment, which is made with reference to the drawings, a brief description of which is provided below.

BRIEF DESCRIPTION OF THE DRAWINGS

FIG. 1 illustrates a system for making an agricultural material from waste paper and a pH adjusting material in accordance with the present invention; and FIG. 2 illustrates a portion of a modified system for making agricultural material from a combination of waste paper and compost material in accordance with the invention.

DETAILED DESCRIPTION OF THE PREFERRED EMBODIMENTS

In a first preferred method in accordance with the invention, an agricultural material for use in mushroom trays is manufactured from a combination of waste paper and a pH adjusting material, which is preferably lime, via a processing system 10. Referring to FIG. 1, the processing system 10 includes a conventional shredder, such as a chopping mill 12, with a hopper 13 to which waste paper is loaded via a belt conveyor (not shown). The waste paper is preferably in the form of sheets of old newspapers. After the waste paper is loaded, the chopping mill 12 shreds or rends the waste paper sheets into smaller paper fragments. A relatively small amount of water may be added to the chopping mill 12, such as 5% by weight of the waste paper, to facilitate the shredding process and reduce paper dust generated from the shredding process and the associated risk of explosion. The amount of water added, if any, depends upon how dry the waste paper is and the relative humidity of the room in which the paper is shredded. The chopping mill 12 may be a conventional mill, such as a Super Rotor 100 horsepower model commercially available from Hammerland Co.

After the paper sheets are shredded, they are pneumatically conveyed to a conventional grinder or hammer mill 14 via a pipe 15. The hammer mill 14, which may be a Model 2436 commercially available from Jacobson Co., is provided with many swinging hammers fixed to a rotating shaft which further rend and grind the paper into smaller, substantially uniform fragments.

Lime is added to the paper fragments prior to the fragments being ground by the hammer mill 14 to adjust the pH of the agricultural material produced so that it is between about 7 and 9, which is the optimal pH range for a casing layer of a mushroom tray. The grinding action of the hammer mill 14 ensures that the lime is uniformly ground into the paper fragments, and thus that all portions of the agricultural material produced have a substantially uniform pH in the desired range. The lime added to the paper fragments can be agricultural lime, lime derived from sugar beets, or lime obtained from other suitable sources. In some cases, where the pH of the waste paper is between about 7 and 9, it might be possible to omit the addition of the pH adjusting material.

After being ground, the paper fragments have a density lower than that of the waste paper sheets fed to the shredder 12 and generally comprise a light, fluff-like material, roughly analogous to cotton balls. The size of the paper fragments output by the hammer mill 14 may be controlled via a screen (not shown), provided at the output of the hammer mill 14, which has holes or apertures of a uniform size so that the paper fragments do not exit the hammer mill 14 until they are smaller than a predetermined size. For example, the holes in the screen may be one inch in diameter.

The paper fragments are pneumatically conveyed from the hammer mill 14 to a cyclone fan 16 via a pipe 17. At the cyclone 16, the air which pneumatically conveys the paper fragments through the pipe 17 is exhausted, and the paper fragments fall into a holding bin 18 via a pipe 19. The cyclone 16 may be a conventional cyclone, such as a five foot diameter cyclone commercially available from Honeyville Co. From the cyclone 16, the paper fragments are conveyed to a holding bin 18 via a pipe 19. The holding bin 18 contains agitating paddles (not shown) to force the relatively light paper fragments downwards to a moisturizing chamber 20 via a pipe 21.

The relatively light paper fragments fall downwards through the moisturizing chamber 20 under the force of gravity. A plurality of spray nozzles (not shown) in the moisturizing chamber 20 spray water on the paper fragments as they fall. Water is sprayed on the paper fragments as a lubricant to allow the paper fragments to be readily forced through holes in the metal cylinder of a pellet mill, as described below, and to ensure that the paper fragments are pelletable, i.e. they hold together after being forced through a pellet mill. The use of water as a lubricant is advantageous since there are no adverse environmental effects when the agricultural material containing the water is added to soil. The amount of water sprayed on the paper fragments in the moisturizing chamber 20 is preferably in the range of 5% to 20% of the weight of the paper fragments, primarily depending upon the moisture content of the waste paper loaded into the system 10, which may depend on the relative humidity of the area in which the system 10 is provided. The total amount of water added to the waste paper prior to shredding and during passage through the moisturizing chamber 20 is preferably between 5% and 25% by weight.

After the paper fragments pass through the moisturizing chamber 20, they are conveyed to an agitator 22, which may be an auger-type agitator, where the paper fragments are thoroughly mixed with the lubricant added at the moisturizing chamber 20. The paper fragments are then conveyed to a feeder 24, which may be an auger-type feeder having twin screws, which supplies the paper fragments to a pellet mill 26.

The density of the paper fragments in the feeder 24 is relatively low compared with the density of the paper fragments in the bottom of the holding bin 18. Consequently, the volumetric rate at which the paper fragments are provided by the feeder 24 to the pellet mill 26 should be a multiple, such as four times, of the volumetric rate at which paper fragments are provided from the holding bin 18 to the moisturizing chamber 20 via agitating paddles of the holding bin 18 so that the accumulation of the paper fragments in the holding bin 18 does not continually increase.

At the pellet mill 26, the paper fragments are densified by being forced through a die (not shown) having numerous holes formed therein by one or more steel rollers within the die. As the paper fragments are extruded through the holes in the die to form strands, the strands are periodically broken off so that pellets of a predetermined length are formed. Although the paper fragments are substantially at room temperature when they are provided to the pellet mill 26, the action of forcing the paper fragments through the holes in the die causes their temperature to rise. The pellet mill 26 may be any conventional pellet mill, such as the Century Series 100 horsepower model commercially available from California Pellet Mill Co.

The pellets are then passed through a cooling chamber 28, which may be a conventional cooling chamber also available from California Pellet Mill Co. After they are cooled, the pellets may optionally be provided to a conventional burr mill 30 to crumble them into smaller pellet fragments. The pellets or pellet fragments are then provided to a holding bin 32 and then to a bagger 34 for bagging them.

All of the steps described above, with the exception of passing the pellets through the cooling chamber 28, are performed substantially at room temperature. As used herein, "room temperature" generally means the ambient temperature of the area in which the processing is taking place. Since all the steps are performed at room temperature, the method is relatively energy efficient.

Since mushrooms do not need a relatively low carbon-to-nitrogen ratio as do other plants or crops, no nitrogen needs to be added to the waste paper fragments during this method. Accordingly, the carbon-to-nitrogen ratio of the agricultural material in accordance with this method is relatively high, being greater than about 70:1. That relatively high carbon-to-nitrogen ratio is due to the relatively high carbon-to-nitrogen ratio of paper, which is about 800:1.

After the agricultural material is formed in accordance with this method, it is utilized in the casing layer of mushroom trays instead of sphagnum moss, which is normally used as the casing layer. Such as casing layer is typically about two inches in depth, and is provided over a base layer of compost material, which generates carbon dioxide gas to facilitate the growth of the mushrooms. The agricultural material in accordance with this method is preferably provided in the form of crumbled pellets in order to allow the passage therethrough of the carbon dioxide gas generated from the compost layer of the mushroom tray. The use of the crumbled paper pellets advantageously lowers the bacterial count of the casing layer. Other materials may be added to the casing layer in which the agricultural material in accordance with the invention is used. For example, the crumbled paper pellets may be mixed with a portion of sphagnum moss prior to adding the mixture to the casing layer, such as 50% crumbled paper pellets and 50% sphagnum moss.

In a second preferred method in accordance with the invention, an agricultural material is manufactured from a combination of waste paper and compost material by the system 10 of FIG. 1, with the system modifications shown in FIG. 2, and several modifications in the steps of the process as described below. As used herein, the term "compost material" is broadly defined to include organic materials such as animal feces or litter, leaves and other plant matter, soil, straw, wood chips, yard waste, municipal waste, etc., and combinations thereof.

Referring to FIG. 2, a portion of a modified processing system is shown. In the modified system, the moisturizing chamber 20 and the agitator 22 of the system 10 of FIG. 1 are not used, and a compost holding bin 40 and a mixer 42 are added. Compost from the compost holding bin 40 is provided to the mixer 42 via a pipe or conveyor 41, and waste paper fragments from the paper holding bin 18 are also added to the mixer 42. Various combinations of paper fragments and compost material may be used. For example, the weight ratio of paper fragments to compost material may vary from about 0.66:1 (40% paper, 60% compost) to about 9:1 (90% paper, 10% compost), and is preferably between about 1.5:1 (60% paper, 40% compost) and 4:1 (80% paper, 20% compost). The particular ratio chosen would depend on the moisture and nitrogen content of the compost and the moisture content of the waste paper fragments. The mixer 42, which may be a conventional mixer, thoroughly mixes the paper fragments and compost together, after which the combined paper fragments and compost material are provided to the feeder 24 (FIG. 1) after it is pelleted by the pellet mill 26 and further processed in accordance with the system 10 of FIG. 1.

In this method, there may be no need to add nitrogen to the combined waste paper and compost material since the compost material typically has a relatively high nitrogen content. The nitrogen content of the compost material can be measured, and the ratio of waste paper to compost added to the mixer 42 can be suitably selected to result in an agricultural product with a desired carbon-to-nitrogen ratio. It is usually unnecessary to add water to the combination of waste paper and compost material since the compost has a relatively high moisture content.

However, it may be desirable to adjust the carbon-to-nitrogen ratio by adding nitrogen in one form or another. The amount of nitrogen added may be selected so that the carbon-to-nitrogen ratio of the agricultural material produced is between about 20:1 and 70:1, but preferably about 30:1. If nitrogen is used in liquid form, it may be sprayed onto the paper fragments after they are ground by the hammer mill 14. For example, the moisturizing chamber 20 of FIG. 1 could be incorporated into the system of FIG. 2 to spray the paper fragments with nitrogen in liquid form as they fall within the moisturizing chamber 20 via one or more spray nozzles (not shown). Where a granular form of nitrogen is used, such as urea-type nitrogen, it could be added to the waste paper prior to its being ground by the hammer mill 14 to ensure that it is uniformly mixed throughout the paper fragments.

The pellets or pellet fragments formed in accordance with this method may generally be used for any agricultural application by applying them to the soil in which plants or crops are to be grown.

Modifications and alternative embodiments of the invention will be apparent to those skilled in the art in view of the foregoing description. This description is to be construed as illustrative only, and is for the purpose of teaching those skilled in the art the best mode of carrying out the invention. The details of the structure and method may be varied substantially without departing from the spirit of the invention, and the exclusive use of all modifications which come within the scope of the appended claims is reserved.

What is claimed is:

1. A method of making an agricultural material and using said agricultural material in a casing layer for a mushroom tray, said agricultural material being made from waste paper and a pH adjusting material, said method comprising the steps of:
   (a) providing an amount of waste paper to a grinding apparatus;
   (b) providing an amount of pH adjusting material to the grinding apparatus;
   (c) grinding the waste paper and pH adjusting material together to form a lower density material, the density of said lower density material being lower than the density of said waste paper, substantially all of said lower density material having a substantially uniform carbon-to-nitrogen ratio in excess of about 70:1 and a substantially uniform pH of between about 7 and 9;
   (d) densifying the lower density material to form an agricultural material having a density higher than the density of said lower density material; and
   (e) providing said agricultural material in the casing layer of a mushroom tray, said casing layer being provided above a compost layer in the mushroom tray.

2. A method as defined in claim 1 additionally comprising the step of, prior to said step (d), adding water to said lower density material while said lower density material is substantially at room temperature, said water being added in an amount so that the overall moisture content of said lower density material after the addition of said water is between about 5% and 25% by weight.

3. A method as defined in claim 1 wherein the carbon-to-nitrogen ratio of said lower density material is in excess of about 800:1.

4. A method as defined in claim 1 wherein said pH adjusting material comprises lime.

5. A method as defined in claim 1 wherein said lower density material is densified by providing it to a pellet mill to form pellets of agricultural material.

6. A method as defined in claim 5 additionally comprising the step of crumbling said agricultural material pellets before they are provided in said casing layer in said step (e).

7. A method as defined in claim 1 wherein said lower density material is densified by providing it to a pellet mill when said lower density material is substantially at room temperature to form pellets of agricultural material.

8. A method of making an agricultural material and using said agricultural material in a casing layer for a mushroom tray, said method comprising the steps of:
   (a) providing an amount of waste paper to a grinding apparatus;
   (b) grinding the waste paper in the grinding apparatus to form a fluff material, the density of said fluff material being lower than the density of said waste paper, substantially all of said fluff material having a substantially uniform carbon-to-nitrogen ratio in excess of about 70:1 and a substantially uniform pH of between about 7 and 9;
   (d) densifying the fluff material by providing it to a densifier to increase the density of the fluff material to form an agricultural material; and
   (e) providing said agricultural material in the casing layer of a mushroom tray, said casing layer being provided above a compost layer in the mushroom tray.

9. A method as defined in claim 8 wherein said fluff material is densified by providing it to a pellet mill to form pellets of agricultural material.

10. A method as defined in claim 8 wherein said fluff material is densified by providing it to a pellet mill when said fluff material is substantially at room temperature to form pellets of agricultural material.

11. A method as defined in claim 10 additionally comprising the step of crumbling said agricultural material pellets before they are provided in said casing layer in said step (e).

12. A method as defined in claim 11 additionally comprising the step of, prior to said step (d), providing a lubricant to said fluff material while said fluff material is substantially at room temperature, said lubricant being provided in an amount so that the overall moisture content of said fluff material after the provision of the lubricant is between about 5% and 25% by weight.

13. A method as defined in claim 11 additionally comprising the step of, prior to said step (d), adding water to said fluff material while said fluff material is substantially at room temperature, said water being added in an amount so that the overall moisture content of said fluff material after the addition of said water is between about 5% and 25% by weight.

14. A method of making an agricultural material and using said agricultural material in a casing layer for a mushroom tray, said agricultural material being made from waste paper and a pH adjusting material, said method comprising the steps of:
   (a) providing an amount of waste paper to a hammer mill;
   (b) providing an amount of pH adjusting material to the hammer mill, said pH adjusting material comprising lime;
   (c) grinding the waste paper and pH adjusting material together in the hammer mill to form a lower density material, the density of said lower density material being lower than the density of said waste paper, substantially all of said lower density material having a substantially uniform carbon-to-nitrogen ratio in excess of about 800:1 and a substantially uniform pH of between about 7 and 9;
   (d) adding water to said lower density material while said lower density material is substantially at room temperature, said water being added in an amount so that the overall moisture content of said lower density material after the addition of said water is between about 5% and 25% by weight;
   (e) densifying the lower density material to form an agricultural material having a density higher than the density of said lower density material, said lower density material being densified by providing it to a pellet mill when said lower density material is substantially at room temperature to form pellets of agricultural material;
   (f) crumbling said pellets of agricultural material to form pellet fragments;
   (g) providing said pellet fragments in the casing layer of a mushroom tray, said casing layer being provided above a compost layer in the mushroom tray.

* * * * *